(12) United States Patent
Rai

(10) Patent No.: US 7,810,095 B2
(45) Date of Patent: Oct. 5, 2010

(54) METHOD AND SYSTEM FOR CHARACTERIZING ELEMENTS OF A PRINT PRODUCTION QUEUING MODEL

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 406 days.

(21) Appl. No.: 11/854,113

(22) Filed: Sep. 12, 2007

(65) Prior Publication Data

US 2009/0070763 A1 Mar. 12, 2009

(51) Int. Cl.
*G06F 9/46* (2006.01)
(52) U.S. Cl. ..................................... 718/102
(58) Field of Classification Search ................. 718/102
See application file for complete search history.

(56) References Cited

U.S. PATENT DOCUMENTS

| | | | | |
|---|---|---|---|---|
| 5,440,480 | A * | 8/1995 | Costanza | 705/8 |
| 5,583,792 | A * | 12/1996 | Li et al. | 709/224 |
| 5,826,244 | A | 10/1998 | Huberman | |
| 6,754,731 | B2 * | 6/2004 | Gargi et al. | 710/16 |
| 6,973,653 | B1 * | 12/2005 | Fairman et al. | 718/104 |
| 6,981,015 | B1 * | 12/2005 | Palmer et al. | 709/201 |
| 7,051,328 | B2 | 5/2006 | Rai et al. | |
| 7,065,567 | B1 | 6/2006 | Squires et al. | |
| 2003/0139952 | A1 * | 7/2003 | Lubash et al. | 705/7 |
| 2004/0186685 | A1 * | 9/2004 | Guo et al. | 702/181 |
| 2005/0283505 | A1 * | 12/2005 | Fujimoto | 708/200 |

OTHER PUBLICATIONS

Jenson, P.O. et al, "A Note on Some Results on M/G/1/K Queue with Removable Server", Information and Management Sciences, vol. 13, No. 2, 2002.*
Langebrekke, Maxim, "Implementation of the Intelligent Printing Management", Nov. 1, 2004.*
Gelenbe, "On Approximate Computer System Models", Journal of the Association for Computing Machinery, vol. 22, No. 2, Apr. 1975, pp. 261-269.
Whitt, "A Diffusion Approximation for the G/GI/n/m Queue", Operations Research, Jun. 27, 2003, Department of Industrial Engineering and Operations Research, Columbia University, New York, New York.
Smith, "M/G/c/K Performance Models", Department of Mechanical and Industrial Engineering, University of Massachusetts, Amherst, Massachusetts.
Dallal, "Why P=0.05?", http://www.tufts.edu/~gdallal/p05.htm, Jun. 12, 2007.
*Print Publication*; "Implementation . . . *Printing Mgmt.*": Langerbrekke; Nov. 1, 2004.

* cited by examiner

*Primary Examiner*—Meng-Ai An
*Assistant Examiner*—Gregory A Kessler
(74) *Attorney, Agent, or Firm*—Pepper Hamilton LLP

(57) ABSTRACT

Methods and systems for characterizing performance of resources in a production environment are disclosed. Timing information for a plurality of print jobs may be received at a resource characterization system from one or more resources. A service time distribution may be determined based on the timing information. Resource performance for the one or more resources may be characterized based on the service time distribution using a queuing model. One or more performance characteristics may be provided for the one or more resources based on the characterized resource performance.

19 Claims, 5 Drawing Sheets

METHOD AND SYSTEM FOR CHARACTERIZING ELEMENTS OF A PRINT PRODUCTION QUEUING MODEL

BACKGROUND

1. Technical Field

The present disclosure generally relates to methods and systems for improving the efficiency of a document production environment, such as a print shop. More specifically, the present disclosure relates to methods and systems for performing performance characterization of data derived from resources in a document production environment using a queuing model.

2. Background

Document production environments, such as print shops, convert printing orders, such as print jobs, into finished printed material. A print shop may process print jobs using resources, such as printers, cutters collators and other similar equipment. Typically, resources in print shops are organized such that when a print job arrives from a customer at a particular print shop, the print job can be processed by performing one or more production functions.

Over time, resources used in document production environments have been provided with network interfaces. In addition, equipment manufacturers have started to provide software development kits and application programming interfaces that can be used to query machines to retrieve machine status and print job characteristics, such as time stamps or other timing information. As such, analyzing data from networked resources in order to characterize resource behavior has become more commonplace.

One method of characterizing performance data in document production environments has been through the use of discrete event simulation models. Scheduling architectures that organize print jobs received by a document production environment and can be used to route the print jobs are known in the art. Exemplary scheduling architectures are described in, for example, U.S. Pat. No. 7,051,328 to Rai et al. and U.S. Pat. No. 7,065,567 to Squires et al. The exemplary scheduling architectures use simulation models to characterize and analyze resources in a document production environment in an attempt to optimize the performance of the environment.

While these scheduling architectures can organize and route print jobs received by a document production environment, such architectures operate based on discrete events such as receiving or processing an individual print job. However, using discrete event simulation models to characterize and analyze resources in a document production environment might not provide a compact and computationally efficient description of the environment, such as a closed-form equation or an approximation for one or more of the parameters in the system.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a system for characterizing performance of print related resources in a print production environment may include a plurality of print related resources, a processor in communication with the print related resources, and a processor-readable storage medium in communication with the processor. The processor-readable storage medium may contain one or more programming instructions for performing a method of characterizing performance of print related resources in the print production environment. The method may include receiving timing information for a plurality of print jobs performed by the print related resources. The timing information may include, for one or more print jobs, a time period for at least one print related resource to perform at least one operation for the print job. The method may further include determining a service time distribution based on the one or more time periods, characterizing print related resource performance based on the service time distribution using a queuing model, and providing one or more performance characteristics for the one or more print related resources based on the print related resource performance.

In an embodiment, a system for characterizing the performance of resources in a document production environment may include one or more resources capable of performing a plurality of print jobs, and a resource characterization system. The resource characterization system may be configured to receive timing information for a plurality of print jobs from the one or more resources, determine a service time distribution based on the timing information, characterize resource performance for the one or more resources based on the service time distribution using a queuing model, and provide one or more performance characteristics for the one or more resources based on the characterized resource performance.

In an embodiment, a computer-implemented method of characterizing the performance of resources in a document production environment may include receiving, at a resource characterization system, timing information for a plurality of print jobs from one or more resources, determining a service time distribution based on the timing information, characterizing resource performance for the one or more resources based on the service time distribution using a queuing model, and providing one or more performance characteristics for the one or more resources based on the characterized resource performance.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
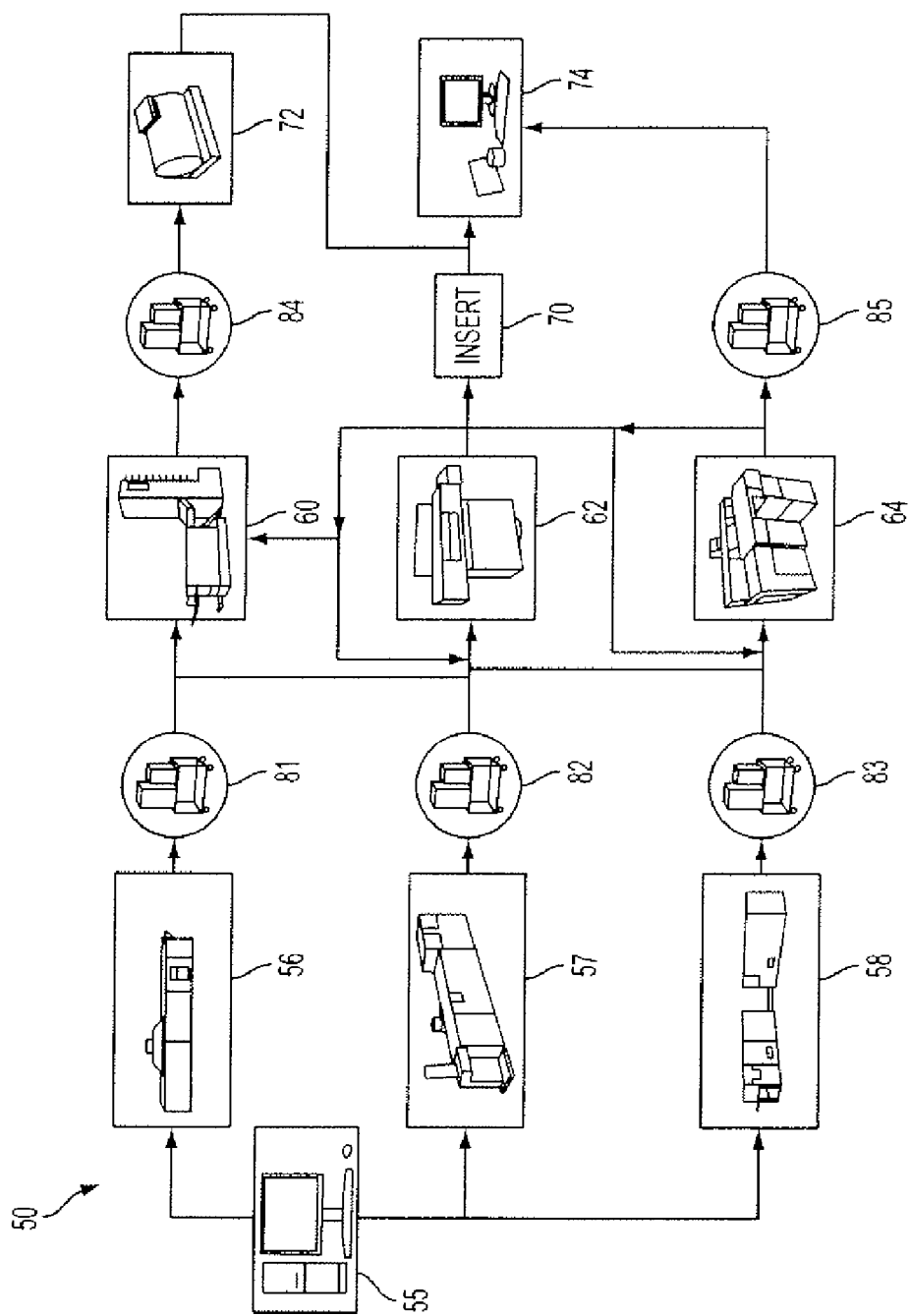
FIG. 1 depicts exemplary elements of a document production environment according to an embodiment.

For purposes of the discussion below, a "document production environment" refers to an entity that includes a plurality of resources, such as printers, cutters, collators, inserters, shrink wrappers and the like, for producing documents. The document production environment may be a freestanding entity, including one or more print-related devices, or it may be part of a corporation or other entity. Additionally, the document production environment may communicate with one or more servers by way of a local area network (LAN) or a wide area network (WAN), such as an intranet, the Internet, the World Wide Web or the like.

The term "device" refers to a machine used to perform an operation. Exemplary devices in a document production environment include printers cutters, collators, inserters, shrink wrappers and the like.

A "resource" refers to an element of a document production environment that performs a function. A resource can be a device or manpower. For example in a document production environment, a human operator may be required to transport an intermediate work product, such as a printed document, between or among resources as part of a job.

A "job" refers to a logical unit of work that is to be completed. For example, a job may include one or more instructions and one or more parameters that, when processed, result in an output. In a document production environment, a job may include one or more print jobs from one or more clients. A production system may produce a plurality of jobs.

A "print job" refers to a job that is processed in a document production environment. For example, a print job may include one or more instructions and one or more parameters that, when processed, result in printed documents such as credit card statements corresponding to a certain credit card company, bank statements corresponding to a certain bank, or the like.

As used herein, to "characterize" means to identify or approximate one or more characteristics or parameters of an environment that is being analyzed, such as a document production environment. Exemplary characteristics or parameters may include a waiting time in a queue, an average number of jobs in the environment or at a resource, and the like. Such characteristics and parameters are also referred to herein as "performance characteristics."

"Resource performance" refers to an expected capability of one or more resources to perform jobs over time. The resource performance is determined based on a service time distribution (as defined below) for the one or more resources. The resource performance may be represented by an approximation or a formula determined by using a queuing model to characterize a service time distribution. Resource performance may further be determined by comparing a service time distribution to parametric statistical distributions to identify a parametric statistical distribution that closely fits the service time distribution (as described below).

"Timing information" refers to data received from one or more resources pertaining to the amount of time to perform one or more operations for at least one print job. For example, timing information may pertain to the time required to complete one or more of a printing operation, a folding operation, a cutting operation, a sorting operation, a raster image processing operation and a finishing operation for at least one print job. Timing information may include, for example and without limitation, a time stamp or a difference between times at which an operation is performed for two consecutively executed print jobs.

A "service time distribution" refers to an ordered distribution of a plurality of time periods for performing an operation. For example, a service time distribution may include an ordered sequence of times that a resource required to perform each of a plurality of operations. The times for a service time distribution may be determined by determining the difference between time stamps. Service time distributions may be determined for one or more operations, such as a printing operation, a folding operation, a cutting operation, a sorting operation, a raster image processing operation and a finishing operation.

FIG. 1 shows an example of a production environment 50, in this case, exemplary elements of a document production environment. Print jobs may enter the document production environment manually or electronically and be collected at an electronic submission system 55 such as a computing device and/or scanner. Print jobs are sorted and batched at the submission system or another location before being delivered to one or more print engines such as a color printer 56, black-and-white printer 57 and/or a continuous feed printer 58. Printed documents may exit the print engine and be delivered to one or more finishing devices or areas such as a collator 60, cutter 62 and/or binder 64. The finishing areas may include automatic or manual areas for such finishing activities, and they also may include an automatic or manual inserter 70. Finally, the documents may move to a postage metering station 72 and/or shipping station 74. Documents for print jobs may move from one location to another in the document production environment by automatic delivery or manual delivery such as by hand or by one or more paper carts 81-85.

Different elements of a production environment may require setup time in order to prepare the device to process a particular print job. For example, some print jobs use pre-printed forms, such as bank statements that are pre-printed with the bank's logo and contact information or credit card statements pre-printed with charge dispute procedures. Forms also may include inserts such as marketing materials or subscription cards. If a device in a document production environment receives two consecutive print jobs that use identical forms, little or no changeover is required between the two print jobs. However, if the forms are different, the print jobs have different setup characteristics, and a significant setup time may be required to load the new form into the machine. This is especially noticeable in continuous feed printing devices 58, where it can take up to 15 minutes or more to load a new form roll.

Queuing network based analytical models ("queuing models") that characterize real data derived from machines may enable a document production environment manager to more fully understand that operation of the environment. Queuing network analysis can provide more insights regarding the variables that cause degradation of performance within a document production environment than discrete-event simulation procedures. Moreover, queuing network analysis is often faster to execute in a stochastic environment.

A queuing model that properly characterizes resources may provide insight into the performance characterization of a document production environment. Characterizing resources may be performed by identifying a service time distribution of a value, such as a print time, an arrival time or the like, over a plurality of operations performed by one or more resources in the environment. Systems and methods for characterizing the resources of a document production environment are described below. Characterizing such resources may enable a determination of bottlenecks and/or underutilized devices in a document production environment. Moreover, characterizing the resources may identify a need for additional and/or removable resources in the document production environment. By characterizing such resources, the efficiency of the document production environment may be improved in light of the anticipated workflow identified by the queuing model.

A queuing model may be described using a/b/c/d notation (Kendall's Notation of Classification), where 'a' denotes an arrival time distribution, 'b' denotes a service time distribution, 'c' defines the number of resources and 'd' denotes the maximum total number of customers. An arrival time distribution is a distribution of the time between print jobs arriving at the document production environment. A service time distribution is a distribution of the amount of time required to process an operation by one or more resources. The maximum number of customers is the maximum number of jobs that can be accommodated by the document production environment. For the purposes described herein, queuing models may be used that seek to analyze M/G/1/K or M/G/c/K systems (M/G/1/K systems are a special case of M/C/c/K systems). As used herein, 'M' describes an exponential distribution, 'G' describes a general distribution (i.e. arbitrary distribution), '1' or 'c' describes the number of resources used to perform a particular operation (such as printing in a document production environment), and 'K' describes the maximum number of jobs in the system.

Exemplary M/G/1/K queuing models may include, for example and without limitation, embedded Markov chains, regenerative analysis and busy period analysis models. Exemplary M/G/c/K queuing models may include a variety of approximation approaches, such as, diffusion approximation, infinite probabilities and two-moment approximation models. Exact solutions to M/G/c/K queuing models are only possible in special cases, such as cases in which a single server is used (M/G/1/K), cases in which there is an exponential service time distribution (M/M/c/K), and cases in which no waiting room is available (M/G/c/0 or, simply, M/G/c).

Figure 2:
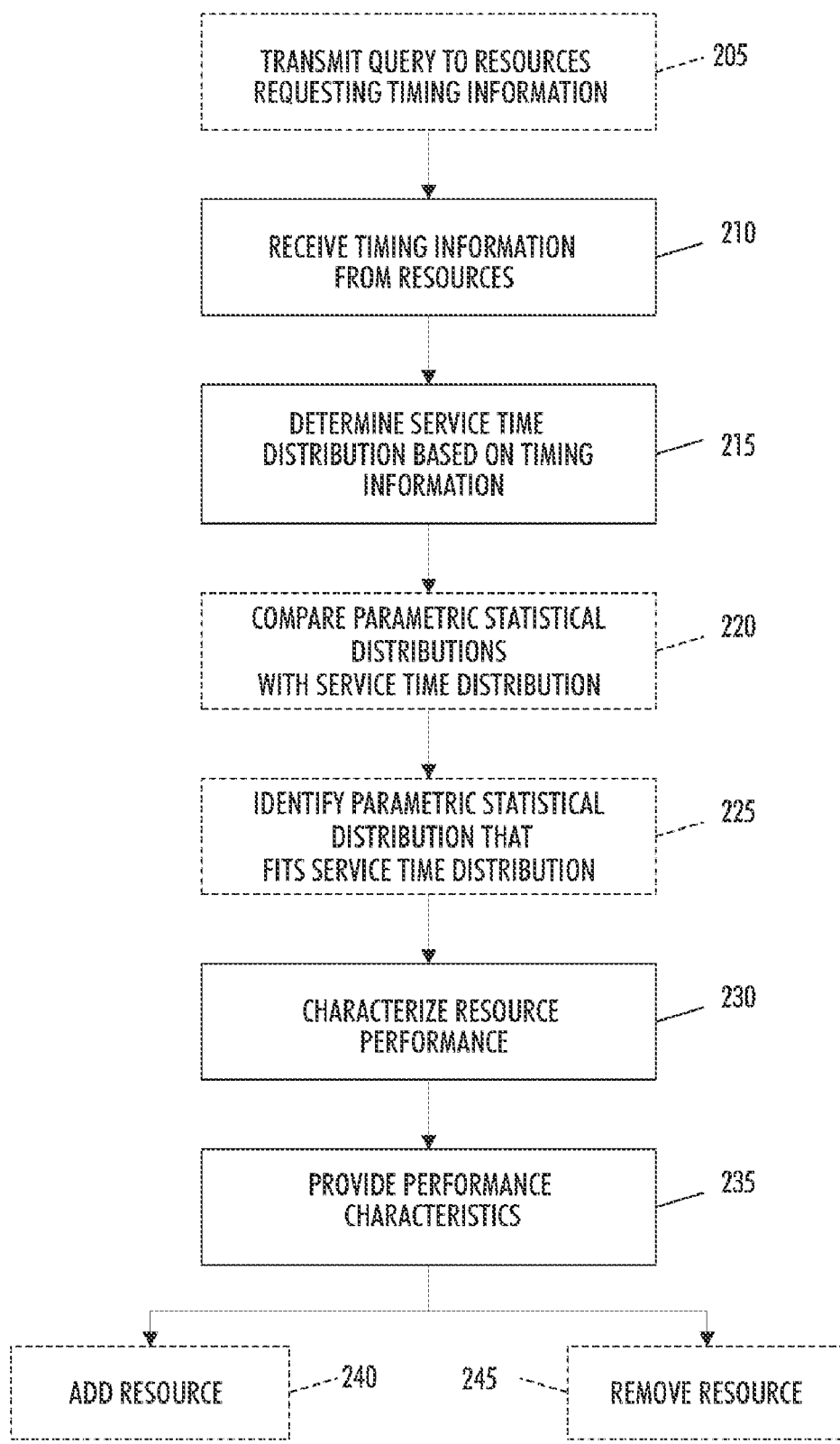
FIG. 2 depicts a flow diagram for an exemplary method of characterizing data derived from a plurality of print jobs in a document production environment according to an embodiment.

FIG. 2 depicts a flow diagram for an exemplary method of characterizing data derived from a plurality of print jobs in a document production environment according to an embodiment. As shown in FIG. 2, timing information pertaining to the performance of printing related operations may be received 210 from one or more resources in a document production environment at a system used to characterize the resource network (i.e., a resource characterization system). In an embodiment, the resource characterization system may initiate the reception of the timing information by transmitting 205 a query to the one or more resources requesting timing information stored in a local memory via a communication interface, such as a data port connected to an intranet, the Internet or the like. Other methods of receiving 210 the timing information at the resource characterization system will be apparent to those of ordinary skill in the art based on this disclosure, such as having the resources periodically transmit timing information to the resource characterization system.

The timing information may pertain to a plurality of print jobs performed by the one or more resources. In an embodiment, the received timing information may pertain to one or more of a printing operation, a folding operation, a cutting operation, a sorting operation, a ripping operation and a finishing operation for a plurality of print jobs. In an embodiment, the timing information may include one or more time stamps for each print job. Exemplary time stamps for a plurality of jobs are shown in Table 1. In an alternate embodiment, the timing information may include a difference between the times at which the same operation is performed for two consecutively executed print jobs.

TABLE 1

| Device Processing Start Time | Device Processing Completed Time | Device Marking Start Time | Device Complete Time |
| --- | --- | --- | --- |
| 6/7/2007 18:09:52 | 6/7/2007 18:10:43 | 6/7/2007 18:10:03 | 6/7/2007 18:16:15 |
| 6/7/2007 19:07:52 | 6/7/2007 19:07:11 | 6/7/2007 19:07:04 | 6/7/2007 19:09:13 |
| 6/15/2007 14:13:12 | 6/15/2007 14:13:21 | 6/15/2007 14:13:18 | 6/15/2007 14:15:18 |
| 6/15/2007 14:13:43 | 6/15/2007 14:13:55 | 6/15/2007 14:13:49 | 6/15/2007 14:15:23 |
| 6/15/2007 14:14:03 | 6/15/2007 14:14:18 | 6/15/2007 14:14:13 | 6/15/2007 14:15:36 |

A service time distribution may be determined 215 based on the timing information. A service time distribution comprises a plurality of time periods for performing an operation. In an embodiment, the amount of time required by a resource to perform an operation may be determined by determining the difference between time stamps. Exemplary time periods for performing a print operation for each of a plurality of print jobs are shown in Table 2. In an embodiment, service time distributions may be determined 215 for one or more operations performed for the plurality of print jobs, such as a printing operation, a folding operation, a cutting operation, a sorting operation, a ripping operation and a finishing operation.

TABLE 2

| Print Job | Print Time (min.) |
| --- | --- |
| 1 | 5.375 |
| 2 | 15.500 |
| 3 | 3.458 |
| 4 | 3.917 |
| 5 | 5.000 |
| 6 | 5.708 |
| 7 | 0.000 |
| 8 | 25.250 |
| 9 | 23.083 |
| 10 | 28.375 |
| 11 | 6.083 |
| 12 | 26.708 |
| 13 | 15.917 |
| 14 | 13.208 |
| 15 | 61.167 |
| 16 | 22.708 |
| 17 | 66.333 |
| 18 | 86.875 |
| 19 | 0.000 |
| 20 | 0.000 |
| 21 | 10.542 |
| 22 | 8.667 |

TABLE 2-continued

| Print Job | Print Time (min.) |
|---|---|
| 23 | 0.000 |
| 24 | 7.042 |
| 25 | 24.583 |
| 26 | 9.708 |
| 27 | 16.167 |
| 28 | 0.042 |
| 29 | 9.500 |
| 30 | 7.875 |
| 31 | 4.708 |
| 32 | 14.083 |
| 33 | 5.458 |
| 34 | 4.583 |
| 35 | 2.417 |
| 36 | 4.500 |
| 37 | 4.417 |
| 38 | 4.417 |
| 39 | 4.750 |
| 40 | 4.167 |
| 41 | 5.250 |
| 42 | 3.417 |
| 43 | 7.958 |
| 44 | 1.167 |
| 45 | 2.500 |
| 46 | 5.042 |
| 47 | 8.542 |
| 48 | 13.167 |
| 49 | 5.000 |
| 50 | 12.167 |
| 51 | 10.250 |
| 52 | 8.917 |
| 53 | 9.167 |
| 54 | 8.958 |
| 55 | 5.167 |
| 56 | 3.542 |
| 57 | 18.958 |

Figure 3:
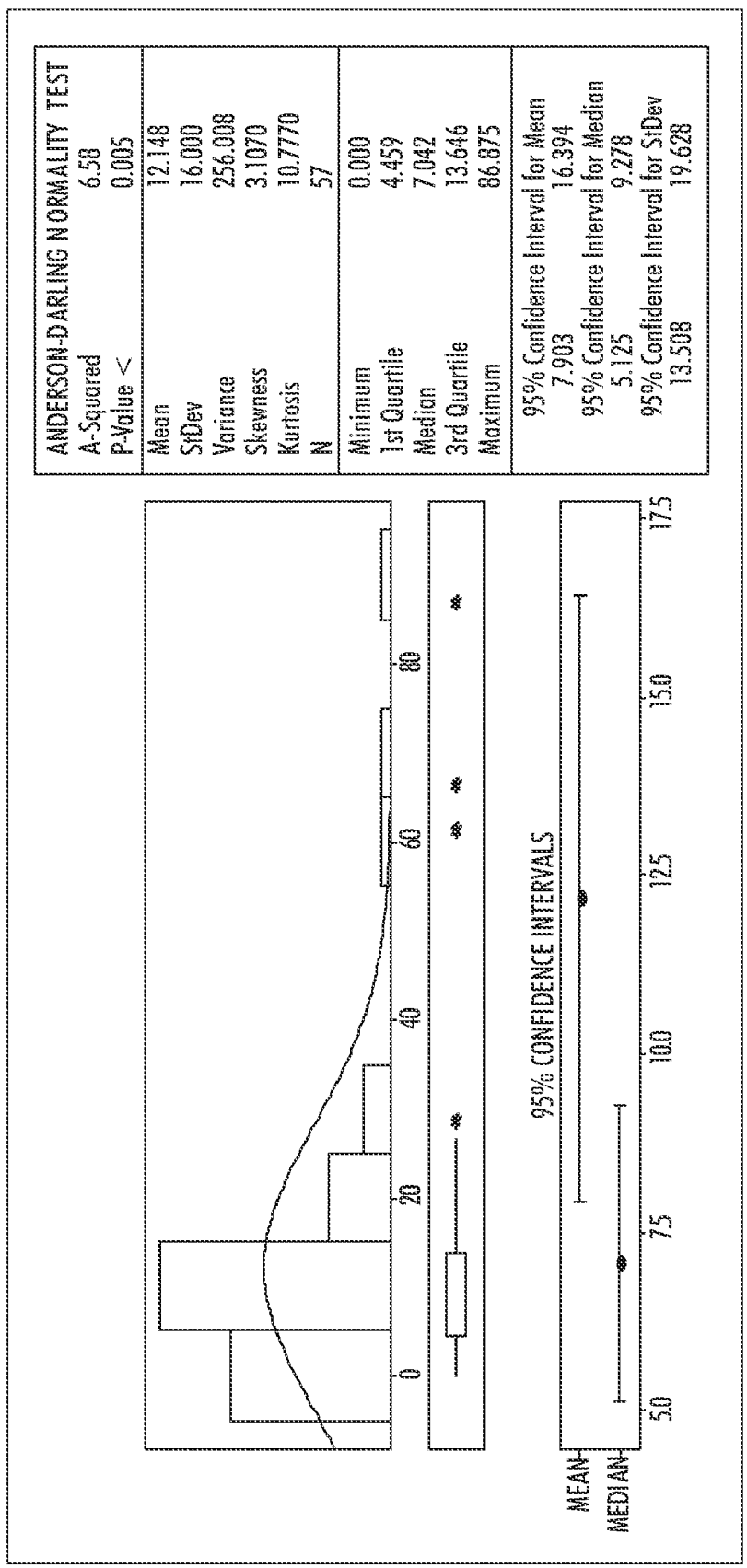
FIG. 3 depicts a histogram for exemplary data derived from a plurality of print jobs performed by a document production environment according to an embodiment.

A resulting service time distribution may be graphically represented in a variety of ways. For example, FIG. 3 depicts a histogram and associated statistics for the exemplary data of Table 2. In an embodiment, a graphical representation of an operation performed by one or more resources and/or of the overall operation of the one or more resources in the document production environment may be displayed.

In an embodiment, one or more moments of the service time distribution may be determined. Such moments may include a mean of the service time, a standard deviation of the service time and the like. In addition, other information may be determined, such as a median service time, a minimum service time, a maximum service time, quartile break points for the service time distribution, a confidence interval for the mean and/or the median service time, a variance for the service time distribution, a skewness of the service time distribution, a kurtosis of the service time distribution and the like. Exemplary descriptive statistics based on the data contained in Table 2 is displayed in Table 3.

TABLE 3

| N | N* | Mean | Std Dev | Median | Minimum | Maximum | Skewness | Kurtosis |
|---|---|---|---|---|---|---|---|---|
| 57 | 0 | 12.1484 | 16.0003 | 7.042 | 0 | 86.875 | 3.10697 | 10.7770 |

In an embodiment, the service time distribution may be compared 220 with one or more parametric statistical distributions (e.g., lognormal, exponential, gamma and the like, such as are shown in Table 4 below) in order to identify 225 a parametric distribution that best fits (i.e., most closely approximates in a statistically significant manner) the service time distribution. As used herein, "statistically significant" means that the parametric statistical distribution used to characterize the service time distribution has a P-value (a probability of obtaining a result at least as extreme as the service time distribution) that is greater than or equal to 0.05. If a parametric statistical distribution fits the service time distribution, the parametric statistical distribution may be used to represent the service time distribution. Other methods for identifying parametric statistical distributions that best fit the service time distribution may also be utilized.

Table 4 identifies nine exemplary parametric statistical distributions and the Anderson-Darling test value and P-value for each parametric statistical distribution. The Anderson-Darling test value for a distribution function is determined by computing a test statistic A that assesses if order data for the distribution function $\{Y_1 < \ldots < Y_N\}$ comes from a distribution with cumulative distribution function (CDF) F, where $A^2 = -N - S$; and $$S = \sum_{k=1}^{N} \frac{2k-1}{N} [\ln F(Y_k) + \ln(1 - F(Y_{N+1-k}))].$$

A is then compared against a critical value for the theoretical distribution, which depends on which F is used, to determine the P-value.

TABLE 4

| Distribution Type | Anderson-Darling | P-Value |
|---|---|---|
| Normal | 6.585 | <0.005 |
| 3-Parameter Lognormal | 0.795 | * |
| 2-Parameter Exponential | 1.431 | 0.028 |
| 3-Parameter Weibull | 4.788 | <0.005 |
| Smallest Extreme Value | 10.221 | <0.010 |
| Largest Extreme Value | 2.421 | <0.010 |
| 3-Parameter Gamma | 4.660 | * |
| Logistic | 3.500 | <0.005 |
| 3-Parameter Loglogistic | 0.607 | * |

By determining the nature of the service time distribution that the resource is experiencing, a queuing network analysis of the document production environment may be performed using one or more of the queuing models. Resource performance may be characterized 230 based on the service time distribution using a queuing model. For example, a queuing model may be selected based upon the number of resources used to perform an operation (i.e., selecting between an M/G/1/K queuing model and an M/G/c/K queuing model). Statistical information determined for the service time distribution may then be utilized by the queuing model to characterize 230 the resource performance of the document production environment. As stated above, the statistical information may include a parametric statistical distribution that approximates the service time distribution in a statistically significant manner. The number of resources in a queuing model may be varied in order to analyze the effect on performance measures such as waiting time, idle time, queue length, throughput and utilization. This analysis may be used to determine an optimal number of resources to meet desired levels of service.

Figure 4:
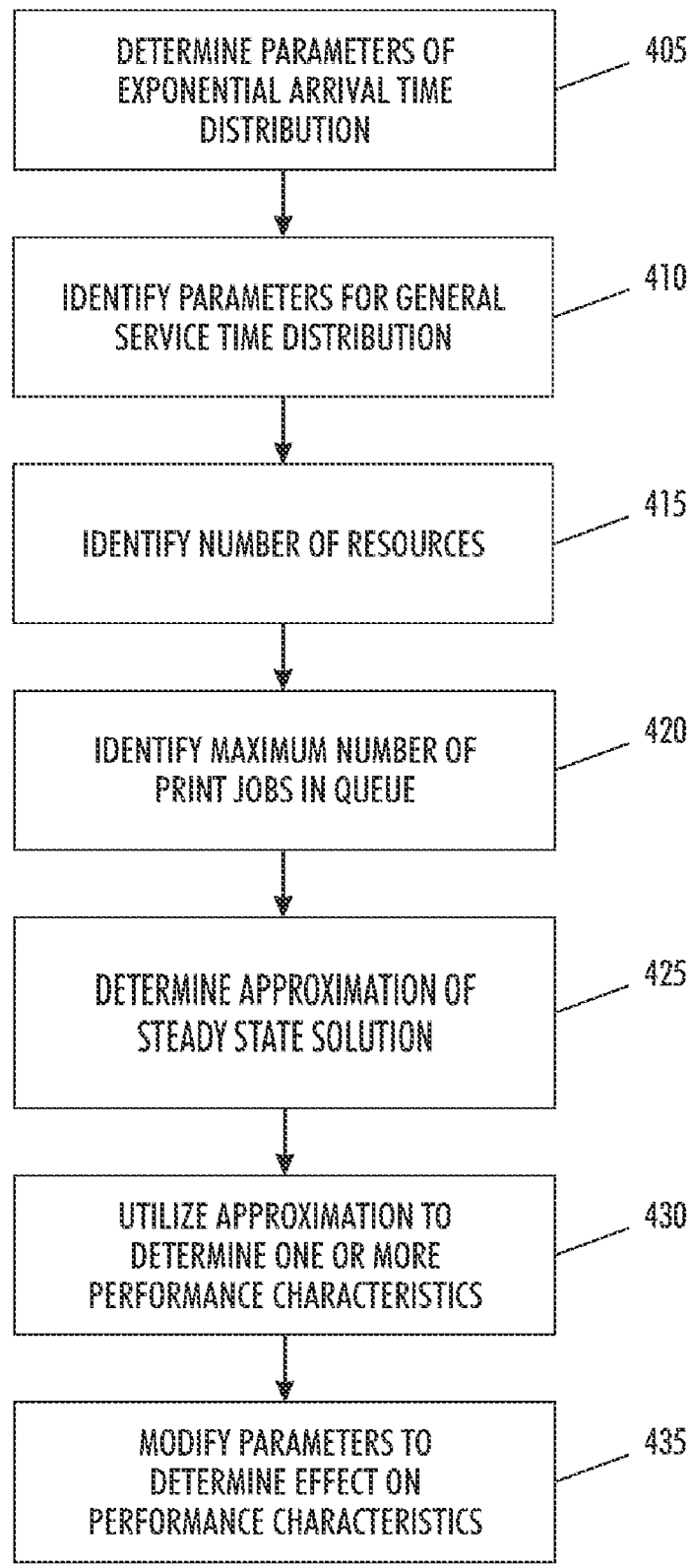
FIG. 4 depicts a flow diagram for an exemplary method of characterizing resource performance for a system where the queuing model comprises a M/G/c/K queuing model.

FIG. 4 depicts a flow diagram for an exemplary method of characterizing resource performance for a system where the queuing model comprises a M/G/c/K queuing model. As shown in FIG. 4, one or more parameters of an exponential arrival time distribution may be determined 405. For example, the one or more parameters may include a mean of the inter-arrival time.

A general service time distribution and associated parameters for the service time distribution may be identified 410. Such parameters may include, without limitation, the location or scale parameter of the statistical distribution.

A number of resources may also be identified 415. For example, a number of devices and/or individuals in a document production environment may be identified 415. If only a single resource is available for a particular operation, the queuing model may comprise a M/G/1/K queuing model.

A maximum number of print jobs in a queue may be identified 420 based on one or more physical constraints. For example, the queue may only be able to accommodate a particular number of jobs based on space limitations within a document production environment. Other constraints with respect to queue size may also have an impact on the maximum number of print jobs for the queue.

An approximation of a steady state solution may be determined 425 for the queuing model. The approximation may be determined 425 based on the exponential arrival time distribution, the general service time distribution, the number of resources and the number of print jobs in a queue.

The approximation may be utilized 430 to determine one or more performance characteristics of the document production environment. As stated above, the performance characteristics may include statistical information pertaining to, for example a parametric statistical distribution that approximates the service time distribution in a statistically significant manner. In an embodiment, the number of resources in a queuing model may be varied in order to analyze the effect on performance measures such as waiting time, queue length and utilization. In an embodiment, the parameters of the exponential arrival time distribution or the general service time distribution, the number of resources and/or the maximum number of print jobs may be modified 435 to determine the effect on one or more of the performance characteristics.

Referring back to FIG. 2, one or more performance characteristics may be provided 235 for the one or more resources based on the resource performance. For example, analytical information pertaining to performance characteristics, such as average waiting time in a queuing network modeling the document production environment, the average work in process time and the like, may be provided 235.

In an embodiment, a resource may be added 240 to the document production environment based on the performance characteristics. In an embodiment, a resource may be removed 245 from the document production environment based on the performance characteristics. In an embodiment, resource addition 240 and/or removal 245 may be performed automatically by identifying one or more target performance measures and varying a number of resources to determine a particular number that achieves the target performance measures.

The impact that results from modifying parameters for the model inputs (i.e., representing various statistical distributions) may also be analyzed. For example the impact of changing the mean of an arrival distribution or service time distribution on a plurality of resources, which could correspond to a change in the job sizes received by the printers, may be analyzed. Modifying other parameters, such as the number of resources, may also be performed within the scope of this disclosure to perform additional analysis. The modified parameters may be used to generate a modified service time distribution. Updated performance characteristics may then be provided based on analysis of the modified service time distribution using a queuing model.

Figure 5:
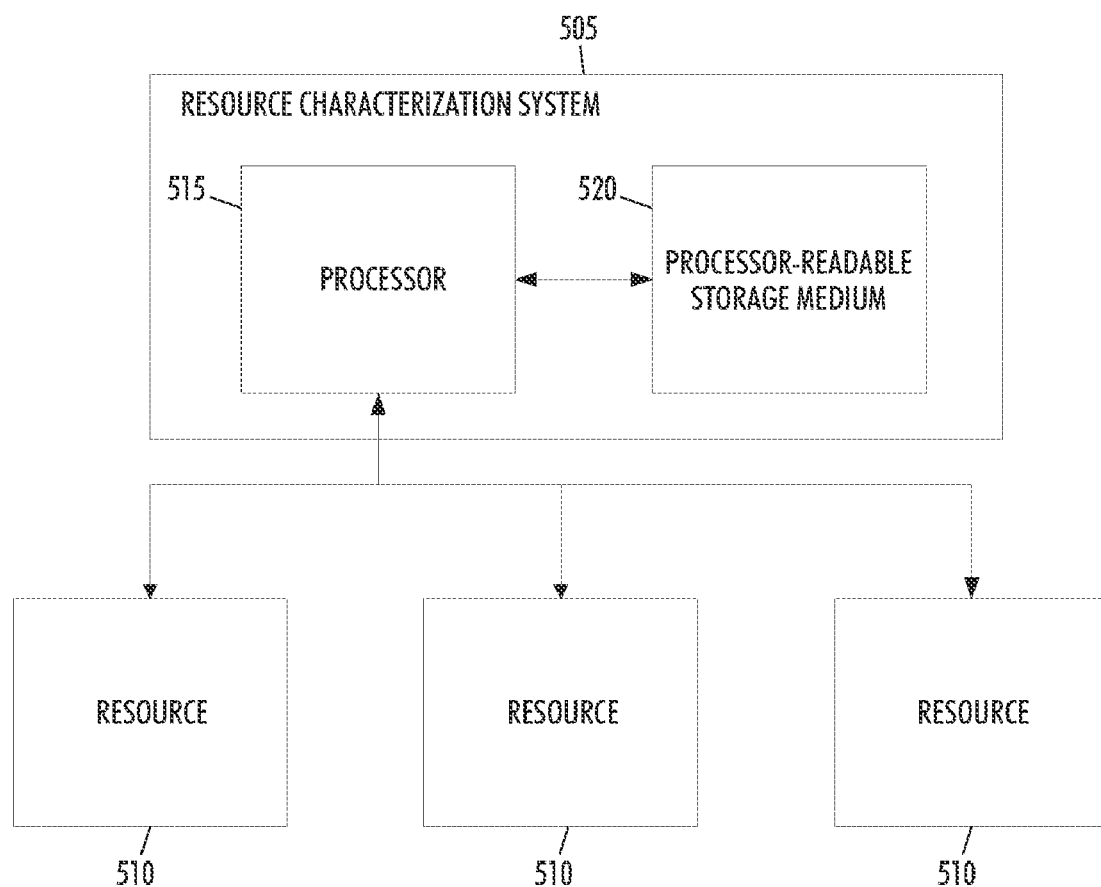
FIG. 5 depicts a block diagram for an exemplary system for processing a plurality of print jobs in a document production environment.

FIG. 5 depicts a block diagram for an exemplary system for characterizing data derived from a plurality of print jobs in a document production environment according to an embodiment. As shown in FIG. 5, the system may include a resource characterization system 505 and a plurality of resources 510 in a document production environment.

In an embodiment, the resource characterization system 505 is computer-implemented in that it includes a processor 515 and a processor-readable storage medium 520 that contains programming instructions that, when executed, perform various functions, such as the functions described above. For example, the resource characterization system 505 may be used to receive timing information from resources 510 in a document production environment, perform statistical analysis determine a service time distribution based on the timing information, characterize resource performance based on the service time distribution using a queuing model and provide one or more performance characteristics based on the resource performance. Additionally the resource characterization system 505 may initiate and or transmit a query to one or more resources 510 requesting the timing information, attempt to fit the service time distribution to one or more parametric statistical distributions, and/or identify a parametric statistical distribution that fits the service time distribution.

The plurality of resources 510 may be used to process the plurality of print jobs. The plurality of resources 510 may include printers, collators, cutters, binders, inserters, shrink wrapping devices, postage meters, and the like. In an embodiment, one or more of the resources 510 may perform multiple functions.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A system for characterizing performance of print related resources in a document production environment, the system comprising:

a plurality of print related resources;

a processor in communication with the print related resources; and a processor-readable storage medium in communication with the processor, wherein the processor-readable storage medium contains one or more programming instructions for performing a method of characterizing performance of print related resources in the document production environment, the method comprising:

receiving timing information for a plurality of print jobs performed by the print related resources, wherein the timing information comprises, for one or more print jobs, a time period for at least one print related resource to perform at least one operation for the print job;

for each of the plurality of print jobs, determining a time interval between a start time of the print job and a completion time of the print job;

aggregating the time intervals to generate a service time distribution;

determining statistical information associated with the service time distribution;

using a queuing model to approximate one or more performance characteristics of the document production environment based on the service time distribution and the statistical information; and displaying one or more of the performance characteristics for the one or more print related resources based on the print related resource performance.

2. The system of claim 1 wherein the one or more performance characteristics comprise one or more of a resource utilization, an average idle time, an average waiting time, a queue length, and a throughput.

3. The system of claim 1 wherein the processor-readable storage medium further contains one or more programming instructions for initiating a query to the one or more print related resources, wherein the query requests the timing information.

4. The system of claim 1 wherein the processor-readable storage medium further contains one or more programming instructions for:

comparing the service time distribution with one or more parametric statistical distributions; and identifying a parametric statistical distribution that fits the service time distribution.

5. A system for characterizing the performance of resources in a document production environment, the system comprising:

one or more resources capable of performing a plurality of print jobs; and a resource characterization system configured to:

receive timing information for a plurality of print jobs from the one or more resources, determine a service time distribution by, for the plurality of print jobs, determining a time interval between a start time of a print job and a completion time of the print job and aggregating the time intervals, determine a desired number of resources that satisfy a service level by:

using a queuing model to approximate one or more performance characteristics of the resources based on the service time distribution, and analyzing an effect on the performance characteristics by varying a number of the resources; and display one or more performance characteristics for the desired number of resources based on the characterized resource performance.

6. The system of claim 5, wherein the resource characterization system is further configured to:

modify the service time distribution to generate an updated service time distribution; and display one or more updated performance characteristics based on the updated service time distribution.

7. The system of claim 5 wherein the resource characterization system is further configured to initiate a query to the one or more resources, wherein the query requests the timing information.

8. The system of claim 5 wherein the resource characterization system is further configured to:

compare the service time distribution with one or more parametric statistical distributions; and identify a parametric statistical distribution that fits the service time distribution.

9. A computer-implemented method of characterizing the performance of resources in a document production environment, the method comprising:

receiving, at a resource characterization system, timing information for a plurality of print jobs from a current number of resources in the document production environment;

determining, by the resource characterization system, a time interval between a start time of the print job and a completion time of the print job for each of the plurality of print jobs;

aggregating the time intervals to generate a service time distribution;

using a queuing model to approximate one or more performance characteristics of the document production environment based on the service time distribution;

identifying one or more target performance characteristics of the document production environment;

in response to the performance characteristics differing from the target performance characteristics, varying the current number of resources to determine a target number of resources that achieve the target performance characteristics;

in response to the target number exceeding the current number, adding a number of resources to the document production environment equal to a difference between the target number and the current number; and in response to the current number exceeding the target number removing a number of the resources from the document production environment equal to a difference between the current number and the target number.

10. The method of claim 9, further comprising:

modifying the timing information to generate a modified service time distribution; and displaying one or more updated performance characteristics based on the modified service time distribution.

11. The method of claim 9, further comprising:

transmitting, by the resource characterization system, a query to the one or more resources, wherein the query requests the timing information.

12. The method of claim 9 wherein receiving timing information for a plurality of print jobs comprises receiving one or more time stamps for each print job.

13. The method of claim 9 wherein receiving timing information for a plurality of print jobs comprises receiving timing information pertaining to one or more of a printing operation, a folding operation, a cutting operation, a sorting operation, a ripping operation and a finishing operation.

14. The method of claim 9 wherein determining a service time distribution comprises generating one or more of a mean, a standard deviation, a variance, a median, a minimum, and a maximum for the timing information.

15. The method of claim 9, further comprising:

comparing the service time distribution to one or more parametric statistical distributions; and identifying a parametric statistical distribution that most closely fits the service time distribution.

16. The method of claim 9 wherein the queuing model comprises a M/G/1/K queuing model, and wherein using a queuing model comprises:

determining one or more parameters of an exponential arrival time distribution;

identifying a general service time distribution and associated parameters for the service time distribution;

identifying a maximum number of print jobs in a queue based on one or more physical constraints;

determining an approximation of a steady state solution for the queuing model based on the parameters for the exponential arrival time distribution, the parameters for the service time distribution, and the maximum number of print jobs; and utilizing the approximation to determine one or more performance characteristics.

17. The method of claim 9 wherein the queuing model comprises a M/G/c/K queuing model and wherein using a queuing model comprises:

determining one or more parameters of an exponential arrival time distribution;

identifying a general service time distribution and associated parameters for the service time distribution;

identifying a number of resources;

identifying a maximum number of print jobs in a queue based on one or more physical constraints;

determining an approximation of the steady state solution for the queuing model based on the parameters for the exponential arrival time distribution, the parameters for the service time distribution, the number of resources, and the maximum number of print jobs; and utilizing the approximation to determine performance characteristics.

18. The method of claim 17 wherein utilizing the approximation to determine performance characteristics comprises determining one or more of the waiting time, queue length and resource utilization.

19. The method of claim 17, further comprising:

modifying one or more of the parameters of the exponential arrival time distribution, the parameters of the general service time distribution, the number of resources, and the maximum number of print jobs to determine the effect on one or more performance characteristics.

* * * * *